United States Patent

Mandorf, Jr. et al.

[15] 3,673,118

[45] June 27, 1972

[54] COMPOSITE ARTICLE CONTAINING HIGH PURITY HOT PRESSED BORON NITRIDE

[72] Inventors: Victor Mandorf, Jr., Olmsted Falls; Lionel Clayton Montgomery, North Olmsted, both of Ohio

[73] Assignee: Union Carbide Corporation, New York, N.Y.

[22] Filed: July 1, 1970

[21] Appl. No.: 51,525

Related U.S. Application Data

[63] Continuation-in-part of Ser. No. 822,214, May 6, 1969, abandoned.

[52] U.S. Cl. ............................................................. 252/520
[51] Int. Cl. ......................................................... H01b 1/06
[58] Field of Search ............................................ 252/518, 520

[56] References Cited

UNITED STATES PATENTS

| | | | |
|---|---|---|---|
| 3,181,968 | 5/1965 | Mandorf, Jr. ........................... | 252/520 |
| 3,256,103 | 6/1966 | Roche, Jr. et al. ...................... | 252/520 |

*Primary Examiner*—Douglas J. Drummond
*Attorney*—Paul A. Rose, Robert C. Cummings and John S. Piscitello

[57] ABSTRACT

High purity boron nitride articles of manufacture having a high density and improved properties. The improved boron nitride articles have a unique acicular crystal structure, an oxygen content of less than 0.5 per cent by weight, a density of at least 1.9 grams/cc., excellent hot strength, low coefficients of thermal expansion with no irreversible thermal expansion, excellent thermal shock resistance, moisture insensitivity and improved dielectric properties. These articles are produced by treating conventional hot pressed boron nitride articles with a suitable solvent to lower their boron oxide ($B_2O_3$) content, and then sintering the treated material in an inert atmosphere at a temperature of from 1,600° to 2,100° C. in the absence of pressure or mechanical restraint. If it is desired to render these articles electrically conductive, an electrically conductive refractory compound may be incorporated therein. Composite articles produced in this manner can be used to produce resistance heated evaporating crucibles for the vaporization of metals.

12 Claims, 2 Drawing Figures

PATENTED JUN 27 1972　　　　　　　　　3,673,118

INVENTORS
VICTOR MANDORF
LIONEL C. MONTGOMERY
BY John S. Piscitello
ATTORNEY

3,673,118

COMPOSITE ARTICLE CONTAINING HIGH PURITY HOT PRESSED BORON NITRIDE

CROSS-REFERENCE TO RELATED APPLICATIONS

This application is a continuation-in-part application of application, Ser. No. 822,214, filed May 6, 1969 now abandoned.

BACKGROUND OF THE INVENTION

1. Field of the Invention

This invention relates to high purity boron nitride articles. More particularly this invention relates to high purity hot pressed boron nitride articles of manufacture having a high density and improved properties.

2. Description of the Prior Art

Boron nitride articles are generally fabricated by press-molding and sintering techniques. The techniques employed are broadly classified as:

a. The hot pressing method: wherein sintering (at 1,700° to 2,200° C.) is carried out simultaneously with the pressure molding process.

b. The cold pressing method: wherein press molding is first carried out, and then sintering is carried out.

A modification of the cold pressing method if disclosed in United Kingdom Pat. specification No. 1,073,936 whereby cold pressed boron nitride powder is sintered by heating in a mold without the application of pressure but while free expansion of the boron nitride due to heating is restricted by the mold.

Boron nitride articles produced by the hot pressing method of fabrication have a high boron oxide ($B_2O_3$) content. While this material acts as a binder-lubricant during hot-pressing and allows such articles to be hot pressed from boron nitride, it also causes a weakening of the properties of the hot pressed articles. Thus, because of the presence of this material, hot pressed boron nitride articles are weak at high temperatures (flexural strengths of about 3,000 psi. or lower at 1,000° C.), exhibit a permanent expansion upon heating to 1,800° C. and cooling to room temperature of close to one per cent (1 per-cent) or more, and pick up sufficient moisture (which chemically combines with the boron oxide present to produce boric acid) under normal humidity conditions to cause cracking if the boron nitride is exposed to a rapid rise in temperature. These properties have restricted the use of boron nitride produced in this manner in many high temperature applications where a strong material with reversible thermal expansion and high thermal shock resistance is required.

Boron nitride articles produced by the cold pressing method are of low density (about 1.5 grams/cc. to 1.6 grams/cc.) and low flexural strength (about 3,000 psi. from room temperature to 1,000° C.). During the sintering stage the cold pressed material undergoes a thermal expansion which remains even after the product is cooled to room temperature. This permanent expansion is caused by the presence of boron oxide ($B_2O_3$) and is of the order of 4.5 to 5 per cent when sintering temperatures of 1,500° to 2,100° C. are employed. Further, because of the expulsion of boron oxide ($B_2O_3$) during sintering, it has not been possible to produce cold pressed articles greater than one-fourth inch to one-half inch in thickness (smallest dimension) without cracking them.

While United Kingdom Pat. specification No. 1,073,936 attempts to overcome the irreversible thermal expansion which cold pressed boron nitride undergoes when it is heated to sintering temperatures (and thereby increase its density) by conducting this operation while restricting the free expansion of the boron nitride in a mold, this method has only been successful in raising the bulk specific gravity of such materials from 6 to 9 per cent to as high as 1.705. Furthermore, the pressure exerted by the escape of boron oxide ($B_2O_3$) during sintering is usually sufficiently great to crack the mold as well as the boron nitride piece itself. In addition, this method does not produce any significant increase in flexural strength over that of conventional cold pressed boron nitride.

United Kingdom Patent specification No. 777,000 reports that hot pressed boron nitride articles having an apparent density in excess of 1.9 grams/cc. can be produced by hot pressing boron nitride particles which had previously been heated in an ammonia atmosphere to reduce the boron oxide content ($B_2O_3$). Boron nitride articles produced in this manner are reported as having a free boron oxide ($B_2O_3$) content of as low as 1.67 percent. Attempts by the patentees to lower the boron oxide ($B_2O_3$) content of such hot pressed articles by heating to 2,100° C. without the application of pressure resulted in rupturing of the bodies. This rupture was attributed by the patentees to the failure to confine the body in a mold while heating. This experiment demonstrates that boron nitride articles hot pressed from boron nitride which has been treated to reduce its boron oxide ($B_2O_3$) content prior to hot pressing still rupture upon heating to high temperatures and are unsuitable for high temperature uses.

Pyrolytic boron nitride having a density in excess of 1.90 grams/cc. has been produced by the reaction of boron trichloride and nitrogen. However, this method has been unsuccessful in producing articles greater than one-fourth inch to one-half inch in thickness (smallest dimension.) Furthermore, the properties of this material are extremely anisotropic in nature. Thus, for example, this material has a flexural strength of about 15,000 psi. at room temperature perpendicular to the direction of the layer planes but below 2,500 psi. parallel to the layer planes. The coefficient of thermal expansion parallel to the direction of the layer planes is about $1 \times 10^{-6}/°$ C. to 1,800° C. compared to about $25 \times 10^{-6}/°$ C. to 1,800° C. perpendicular to the layer planes.

SUMMARY OF THE INVENTION

In accordance with the instant invention it has now been discovered that very high purity boron nitride articles having a high density and a unique acicular crystal structure can be obtained by treating hot pressed boron nitride articles with a suitable solvent to lower their boron oxide ($B_2O_3$) content and then sintering the treated material in an inert atmosphere at a temperature of from 1,800° to 2,100° C. in the absence of pressure or mechanical restraint. Because of the manner in which these articles are prepared, it is for the first time possible to prepare large structural shapes of boron nitride (e.g., having a thickness [smallest dimension] in excess of 1 inch) having a very low boron oxide ($B_2O_3$) content and high density. These shapes are characterized by a unique combination of properties not hitherto found in any available form of boron nitride including excellent hot strength, low coefficients of thermal expansion with no irreversible thermal expansion, excellent thermal shock resistance, moisture insensitivity and improved dielectric properties.

The improved boron nitride articles of the instant invention have an oxygen content of less than 0.5 per cent by weight, generally from 0.1 per cent by weight to 0.2 per cent by weight, and a density of at least 1.9 grams/cc., generally from 1.9 grams/cc. to 2.1 grams/cc. While conventional hot pressed boron nitride is characterized by a decrease in flexural strength as it is heated to temperatures up to about 900° C., the hot pressed boron nitride of the instant invention is characterized by an uninterrupted increase in flexural strength with increasing temperatures up to about 2,000° C. The decrease in flexural strength of conventional hot pressed boron nitride up to temperatures of about 900° C. is caused by the presence of relatively large amounts of boron oxide ($B_2O_3$) which melts at 525° C. and weakens the bonds of the hot pressed article causing a sharp drop in flexural strength of from up to about 15,000 psi. at room temperature to about 3,000 psi. or less at 900° C. Cold pressed boron nitride, on the other hand, has a lower boron oxide ($B_2O_3$) content and its flexural strength remains constant at about 3,000 psi. when heated from room temperature to 1,000° C. The low flexural strength of this material is attributed to its low density. By contrast, hot pressed boron nitride treated according to the instant invention increases in flexural strength from about 6,000 psi. at room temperature to as high as 17,000 psi. or more at 2,000° C. At 1,000° C., the flexural strength of this material is greater than about 6,000 psi. vs. about 3,000 psi. or less for both conventional hot pressed and cold pressed boron nitride. At 2,000° C., the flexural strength of the treated hot pressed boron nitride increases to as high as 17,000 psi. or more vs. about 8,000 for the untreated hot pressed boron nitride.

Because of the elimination of boron oxide ($B_2O_3$), the treated hot pressed boron nitride articles of the instant invention undergo no measurable irreversible thermal expansion when heated to 1,800° C. and subsequently cooled to room temperature. By way of contrast, conventional hot pressed boron nitride articles undergo a permanent expansion of close to one per cent (1 percent) or more under these conditions. The absence of irreversible thermal expansion of the hot pressed boron nitride articles of the instant invention and their low thermal expansion characteristics (coefficient of thermal expansion: parallel to the direction of hot pressing, below $2 \times 10^{-6}/°$ C. to 1,800° C.; perpendicular to the direction of hot pressing, below $3 \times 10^{-6}/°$ C. to 1,800° C. vs. greater than $4 \times 10^{-6}/°$ C. to 1,800° C. and $8 \times 10^{-6}/°$ C. to 1,800° C., respectively, for conventional hot pressed boron nitride) makes these materials extremely resistant to thermal shock and suitable for use at very high temperatures. While pyrolytic boron nitride also exhibits no irreversible thermal expansion after heating to 1,800° C. and a coefficient of thermal expansion in the direction parallel to the layer planes of about $1 \times 10^{-6}/°$C. to 1,800° C., this material is extremely anisotropic in character and its coefficient of thermal expansion in the direction perpendicular to the layer planes is about $25 \times 10^{-6}/°$ C. to 1,800° C.

The elimination of boron oxide ($B_2O_3$) from the treated boron nitride articles of the instant invention renders these materials extremely non-hygroscopic. As a result they pick up less than one per cent (1 percent) by weight moisture when exposed to one hundred per cent (100 percent) relative humidity for one hundred (100) hours at room temperature. Thus, after exposure to the aforesaid conditions, the moisture content of such articles has been measured as about 0.8 – 0.9 per cent by weight. After standing for 72 hours at room temperature at 37 to 45 per cent relative humidity, the moisture content drops to about 0.2 per cent by weight. Conventional cold pressed boron nitride exhibits similar moisture insensitivity, but when conventional hot pressed boron nitride is treated under the same conditions, it picks up in excess of 2 per cent by weight moisture at 100 per cent relative humidity and still possesses at least about 0.5 per cent by weight moisture content after standing for 72 hours at room temperature at 37 to 45 per cent relative humidity. While the boron nitride of the instant invention completely loses absorbed water on heating, the moisture absorbed by conventional hot pressed boron nitride chemically combines with the boron oxide ($B_2O_3$) present in this material to form boric acid which on heating causes spalling of the hot pressed boron nitride by the rapid expulsion of water at critical temperatures up to about 300° C.

The improved dielectric properties of the boron nitride articles of the instant invention are also attributed to the low boron oxide ($B_2O_3$) content of these materials. Typically these materials are characterized by a loss tangent of less than 0.0006 up to 1000° C. and less than 0.005 up to 1400° C. as compared to, for example, loss tangents of more than 0.003 at 1,000° C. and more than 0.010 at 1,400° C. for conventional hot pressed boron nitride at 4.44 to 4.53 GHz ($10^9$ cycles/second). At the latter temperature, the improved boron nitride articles of the instant invention exhibit an increase of less than five per cent (5 percent) in dielectric constant (4.24 at 1,470° C. vs. 4.08 at 25° C.). Further, because of the moisture insensitivity of the boron nitride articles of the instant invention, the electronic properties of these materials are substantially unaffected after long exposure to the atmosphere. On the other hand, moisture absorption greatly interferes with the dielectric properties of conventional hot pressed boron nitride causing unpredictable variations in loss tangent and reducing the attractiveness of this material for electronic applications, particularly at high temperatures. Dielectric properties of a specimen of boron nitride prepared in accordance with the instant invention are set forth in Table I below.

TABLE I

Dielectric Properties

| T°C | K (Dielectric Constant) | Tan Δ (Dissipation Factor) |
|---|---|---|
| | At 8.52 GHz | |
| 25 | 4.04 | 0.00025 |
| | At 4.44 to 4.53 GHz | |
| 25 | 4.08 | 0.00026 |
| 113 | 4.08 | 0.0003 |
| 185 | 4.09 | 0.0005 |
| 322 | 4.09 | 0.00055 |
| 423 | 4.10 | 0.00040 |
| 530 | 4.11 | 0.00035 |
| 659 | 4.12 | 0.00040 |
| 752 | 4.13 | 0.00045 |
| 863 | 4.13 | 0.00050 |
| 943 | 4.14 | 0.00050 |
| 1021 | 4.15 | 0.00055 |
| 1096 | 4.16 | 0.00080 |
| 1170 | 4.16 | 0.0013 |
| 1219 | 4.17 | 0.0019 |
| 1287 | 4.18 | 0.0034 |
| 1373 | 4.19 | 0.0040 |
| 1427 | 4.20 | 0.0028 |
| 1446 | 4.22 | 0.0023 |
| 1460 | 4.24 | 0.0044 |
| 1470 | 4.24 | 0.0046 |

The high purity hot pressed boron nitride of the instant invention like conventional boron nitride, whether hot pressed, cold pressed or pyrolytic, can be widely utilized because of its excellent combination of properties such as high thermal conductivity, chemical resistance, high electrical resistivity, machinability, nontoxicity and inability to be wet by many molten metals and halide salts. In addition, this novel material can be prepared in structural shapes of a size not possible from cold pressed or pyrolytic boron nitride. Furthermore, because of its low dissipation factor over a wide temperature range this material is well suited for use as microwave and radar dielectric components (radar windows) whereas high loss factors present a serious problem when conventional hot pressed boron nitride is used as the dielectric. In addition, its increased moisture insensitivity, high temperature stability and excellent thermal shock resistance render it useful as plasma arc insulation.

DESCRIPTION OF THE PREFERRED EMBODIMENT

Figure 1:
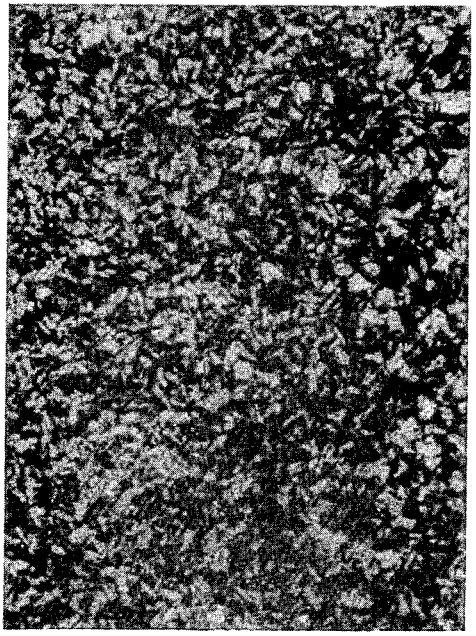
FIG. 1 is a photomicrograph having a magnification factor of 500 of the surface of a sample of boron nitride which had been hot pressed at a temperature of 1,800° C. under a pressure of 2,000 psi. and then soaked in methanol to remove boron oxide ($B_2O_3$) and dried. The view is parallel to the direction of hot pressing.
Figure 2:
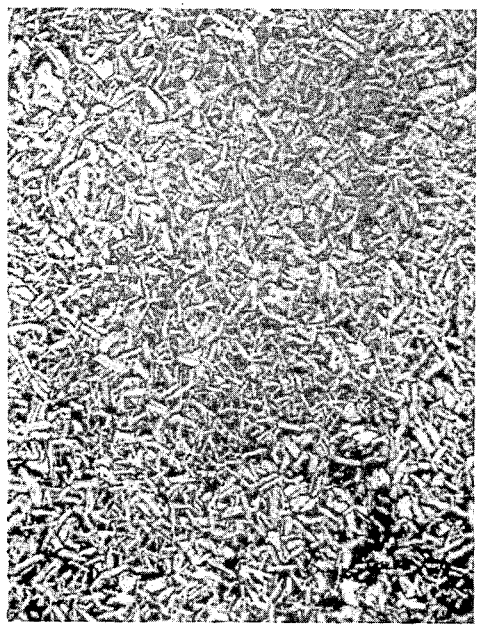
FIG. 2 is a photomicrograph having a magnification factor of 500 of the surface of a sample of boron nitride which had been hot pressed at a temperature of 1,800° C. under a pressure of 2,000 psi., soaked in methanol to remove boron oxide ($B_2O_3$), dried, and then sintered at 2,000° C. by the process of the instant invention. The view, as in FIG. 1, is parallel to the direction of hot pressing. The crystal structure of the sample is acicular compared to the more plate-like structure of FIG. 1.

The high-purity high density boron nitride articles of the instant invention are produced by first treating conventional hot pressed boron nitride articles to lower their boron oxide ($B_2O_3$) content, and then sintering the treated material in an inert atmosphere at a temperature of from 1,800° to 2,100° C. in the absence of pressure or mechanical restraint. In order to obtain boron nitride articles having the unique properties described it is necessary to substantially completely remove boron oxide ($B_2O_3$) from the conventional hot pressed boron nitride article employed before sintering.

Substantially complete removal of boron oxide ($B_2O_3$) from the conventional hot pressed boron nitride articles employed is effected according to the process of the instant invention by immersing the hot pressed material in a solvent capable of dissolving or reacting with boron oxide ($B_2O_3$) to form soluble reaction products until it undergoes no further weight loss. The time required to effect removal of boron oxide ($B_2O_3$) will depend upon the size of the boron nitride piece and the particular solvent employed. When methanol is employed as solvent, leaching for four (4) days has been found necessary for boron nitride cylinders one-half inch (one-half inch) in diameter, eighteen (18) days for cylinders one inch (1 inch) in diameter, and forty-four (44) days for cylinders two and one-half inches (2½ inch) in diameter. With agitation of the methanol solvent, these times can be lowered to one (1) day for boron nitride cylinders one-half inch (½ inch) in diameter, four (4) days for cylinders one inch (1 inch) in diameter, and twenty (20) days for cylinders two and one-half inches (2½ inch) in diameter.

Among the solvents which can be employed to effect removal of boron oxide ($B_2O_3$) are water and alcohols, including primary, secondary and tertiary alcohols. The most preferred alcohols those alcohols containing up to about four (4) carbon atoms. Illustrative of the alcohols which can be employed are aliphatic alcohols such as methanol, ethanol, propanol, isopropanol, butanol, isobutanol, heptanol, octanol, glycerol, and the like, and aromatic alcohols such as benzyl alcohol, phenethyl alcohol and the like. When water is employed as solvent, the boron nitride piece should not exceed one-half inch (½ inch) in diameter in order to effect a complete removal of boron oxide ($B_2O_3$). The addition of a small amount of a strong acid such as hydrochloric acid to the water helps speed up the dissolution of the boron oxide ($B_2O_3$).

After immersion in a suitable solvent, the hot pressed boron nitride is first dried by heating and then further heated in the absence of pressure or mechanical restraint in an inert atmosphere at a sintering temperature in the range of from 1,800° to 2,100° C. By an inert atmosphere is meant an atmosphere which is nonreactive with boron nitride under the heating conditions employed. Inert gases such as nitrogen, helium, neon, argon, krypton, xenon, ammonia, and the like, provide suitable atmospheres in which hot pressed boron nitride may be sintered. Temperatures of from 1,950° to 2,050° C. are preferred as the highest flexural strengths are obtained at such temperatures. The sintering temperature should not be permitted to exceed 2,100° C. as decomposition of the boron nitride occurs above such temperature. Where lower flexural strengths are tolerable, e.g., about 3,500 psi. at room temperature (perpendicular to pressing direction), sintering temperatures as low as 1,600° C. can be employed. Sintering should be continued for about at least 1 hour, preferably at least 2 hours, to obtain the highest flexural strengths.

The following example is set forth for purposes of illustration so that those skilled in the art may better understand this invention and it should be understood that it is not to be construed as limiting this invention in any manner.

EXAMPLE 1

A cylindrical boron nitride plug 14 inches long and 14 inches in diameter which had been hot pressed at a temperature of 1,800° C. under a pressure of 2,000 psi. was machined to produce a number of smaller boron nitride pieces, including one 3 × 2 × 0.5 inch in size. This piece was dried by heating at 200° C., weighed, and then immersed in flowing water until no further loss in weight occurred. A period of 14 days was required to bring the boron nitride piece to constant weight. During this time the piece was periodically removed from the water, dried at 200° C. and weighed to determine if any further loss in weight had occurred. The loss in weight was due to the removal of boron oxide ($B_2O_3$) and amounted to 5.2 per cent of the original weight of the piece. The flexural strength of the piece after being brought to constant weight was 950 psi. at room temperature (perpendicular to pressing direction).

After the boron nitride piece had been brought to constant weight, it was heated to 2,000° C. under an atmosphere of flowing argon over a period of 4⅔ hours (3 hours to heat from room temperature to 1,500° C., 1⅔ hours to heat from 1,500° to 2,000° C.) and maintained at this temperature for 2 additional hours. At the end of this time the piece was weighed again and found to have undergone a further weight loss of 0.85 per cent.

A cylindrical piece of boron nitride 6 inches long and 2½ inches in diameter which had been hot pressed at a temperature of 1,800° C. under a pressure of 2,000 psi was sintered as described above after having been immersed in methanol for 44 days to bring it to constant weight. The loss in weight in methanol amounted to 3.3 per cent while the loss in weight during sintering amounted to 0.47 per cent. The flexural strength of the piece after being brought to constant weight in methanol but before sintering was 980 psi. at room temperature (perpendicular to pressing direction).

The properties of the two sintered boron nitride pieces are set forth in Table II below and compared to the properties of a like hot pressed boron nitride piece which had not been treated with water or alcohol and sintered at 2000° C., an untreated piece hot-pressed at 2,000° C. and 2,000 psi., a boron nitride piece hot pressed at 1,800° C. and 2,000 psi. from boron nitride containing 1.65 per cent by weight oxygen, a boron nitride piece cold pressed at 30,000 psi. and sintered at 2,000° C., and a piece of pyrolytic boron nitride.

TABLE II

|  | BN hot-pressed at 1,800° C. and 2,000 p.s.i., treated in water and sintered at 2,000° C. | BN hot-pressed at 1,800° C. and 2,000 p.s.i., treated in methanol and sintered at 2,000° C. | BN hot-pressed at 1,800° C. and 2,000 p.s.i. | BN hot-pressed at 2,000° C. and 2,000 p.s.i. | BN containing 1.65% oxygen hot-pressed at 1,800° C. and 2,000 p.s.i. | BN cold-pressed at 30,000 p.s.i. and sintered at 2,000° C. | Pyrolytic BN |
|---|---|---|---|---|---|---|---|
| Oxygen content (wt. percent) | 0.3 | 0.3 | 2.9 | 3.0 | 1.65 | 0.3 | 0 |
| Density, grams/cc | 1.9 | 2.0 | 2.1 | 2.1 | 2.0 | 1.6 | 2.2 |
| Flexural strength, p.s.i.: (A): |  |  |  |  |  |  |  |
| 25° C |  |  |  |  |  |  |  |
| 1,000° C |  |  |  |  | 15,200 | 12,700 | (***) |
| 1,500° C |  |  |  |  | 2,500 |  | (***) |
| 2,000° C |  |  |  |  |  |  | (***) |

Table II—Continued

|  | BN hot-pressed at 1,800° C. and 2,000 p.s.i., treated in water and sintered at 2,000° C. | BN hot-pressed at 1,800° C. and 2,000 p.s.i., treated in methanol and sintered at 2,000° C. | BN hot-pressed at 1,800° C. and 2,000 p.s.i. | BN hot-pressed at 2,000° C. and 2,000 p.s.i. | BN containing 1.65% oxygen hot-pressed at 1,800° C. and 2,000 p.s.i. | BN cold-pressed at 30,000 p.s.i. and sintered at 2,000° C. | Pyrolytic BN |
|---|---|---|---|---|---|---|---|
| (B): |  |  |  |  |  |  |  |
| 25° C | 6,064 | 6,000 | 12,600 | 14,300 | 10,900 | 3,272 | 15,000 |
| 1,000° C | 6,361 | 7,100 | 2,800 | 2,500 | 3,000 | 3,000 | 17,000 |
| 1,500° C | 9,331 | 9,000 | 2,800 |  |  |  | 19,000 |
| 2,000° C | 14,779 | 17,000 | 8,000 |  |  |  | 37,000 |
| Coefficient of thermal expansion ×10⁻⁶/°C. (room temp. to 1,800° C.): |  |  |  |  |  |  |  |
| (A) | 0.83 | 0.72 | 6.5 | 4.4 | 1.7 |  | 1.0 |
| (B) |  | 1.95 | 9.15 | 8.3 | 4.4 | 1.39 | 25.0 |
| Percent permanent expansion after heating to 1,800° C.: |  |  |  |  |  |  |  |
| (A) | 0 | 0 | 1.0 | 0.7 | 0.02 | 0.05 | 0 |
| (B) | 0 | 0 | 1.5 | 1.4 | 0.45 |  | 0 |
| Moisture pickup after exposure to 100% relative humidity for 100 hrs. at room temp., wt. percent | 0.85 | 0.9 | 3.15 | *2.48 | *2.49 | 0.79 | 0 |
| Moisture content after exposure to 100% relative humidity for 100 hrs. at room temp. and 37-45% relative humidity for 72 hrs., wt. percent |  | 0.2 | 0.8 | **2.03 | **.90 | 0.21 | 0 |

*140 hours exposure.
**140 hours at 100% relative humidity and 16 hours at 37-45% relative humidity.
***Piece cannot be made in sufficient thickness to measure.

NOTE.—(A) Measured parallel to pressing direction or the direction of the layer planes in the case of pyrolytic BN; (B) Measured perpendicular to pressing direction or across the layer planes in the case of pyrolytic BN.

When a boron nitride piece about 0.3 inch thick which had been hot pressed at 1,800° C. and 2,000 psi. was exposed to atmospheric conditions for a week and heated to white heat as rapidly as possible with an acetylene torch (heating time to white heat approximately 30 seconds), the surface of the piece exploded into powder and small chunks. The explosion was caused by the expulsion of water resulting from the decomposition of boric acid present in the boron nitride.

When a similar piece of hot pressed boron nitride which had been treated in water and sintered in accordance with the process of the instant invention was treated in a similar manner by heating three times to white heat and quenching twice in cold water no deterioration of the piece occurred.

When a cylindrical piece of boron nitride 5 inches long and 3½ inches in diameter which had been cold pressed under a pressure of 20,000 psi. was heated to 2,000° C. in a mold without the application of pressure under an atmosphere of flowing argon over a period of 5 hours (400° C./hour) and then maintained at this temperature for 2 additional hours, the pressure exerted by the escape of boron oxide ($B_2O_3$) during heating caused the mold to crack. Upon cooling, the boron nitride piece was removed from the mold and reheated in a furnace to 2,000° C. as previously described. The product so produced was found to have a density of 1.6 grams/cc., a flexural strength of 2,600 psi. at room temperature parallel to the pressing direction, and a flexural strength of 2,500 psi. at room temperature perpendicular to the pressing direction.

If it is desired to render the high purity boron nitride articles of the instant invention electrically conductive, an electrically conductive refractory compound may be incorporated therein. Suitable conductive refractory compounds include titanium diboride, zirconium diboride, titanium carbide and mixtures thereof. Composites produced in this manner are electrically conductive and can be used, for example, to produce resistance heated evaporating crucibles for the vaporization of metals. Crucibles of this type are described in U.S. Letters Pat. No. 3,181,968 and are used for the deposition of thin metallic films on various objects.

The amount of conductive refractory compound present in the composites of the present invention can range from about 50 per cent by weight to about 70 per cent by weight, the balance being boron nitride. The boron nitride particles are blended with the conductive refractory compound to form a uniform dispersion of the two materials, and the mixture is hot pressed at a temperature of from about 1,700° to about 2,000° C. and a pressure of from about 500 to about 2,000 psi. The resultant hot pressed piece is then treated to lower the boron oxide ($B_2O_3$) content and sintered in the manner described above, i.e., it is first treated with a suitable solvent and then sintered, after drying, in an inert nonreactive atmosphere at a temperature of from 1,600° to 2,100° C., preferably from 1,800° to 2,100° C., in the absence of pressure or mechanical restraint. The sintered composite, like articles formed from boron nitride only, is characterized by high density, excellent hot strength, relatively low coefficients of thermal expansion and low irreversible thermal expansion, excellent thermal shock resistance, and moisture insensitivity. As in the case of articles formed solely from boron nitride according to the invention, these improved properties are attributed largely to the low boron oxide ($B_2O_3$) content of the composite.

The boron nitride-refractory compound composites of the present invention, like articles formed solely from boron nitride according to the invention, have an oxygen content of less than 0.5 per cent by weight. As a result, they are extremely non-hygroscopic and pick up less than one per cent (1 per cent) by weight moisture when exposed to one hundred per cent (100 percent) relative humidity for one hundred hours at room temperature. Upon heating, this absorbed water is readily and completely lost.

The density of the composites of the present invention varies with the amount and particular refractory compound employed. When titanium diboride is the refractory compound, it generally varies from 2.6 grams/cc. to 3.4 grams/cc. As in the case of articles formed solely from boron nitride, the composites of the present invention are characterized by an uninterrupted increase in flexural strength with increasing temperature. Thus, such composites increase in flexural strength (perpendicular to the direction of hot pressing) from as low as about 7,500 psi. at room temperature to at least about 12,000 psi. and as high as 20,000 psi. or more at 1,500° C., usually from about 13,000 psi. to about 15,000 psi. Composites formed from boron nitride and a refractory compound in a conventional manner, on the other hand, while exhibiting flexural strengths as high as 30,000 psi. or more at room temperature are characterized by a steady decrease in strength at increasingly higher temperatures and have flexural strengths of 3,000 psi. or less at 1,500° C.

When heated to 1,800° C. and subsequently cooled to room temperature the composites of the present invention undergo an irreversible thermal expansion of less than 0.3 per cent compared to an irreversible thermal expansion of greater than 1.8 per cent which is exhibited by composites formed from boron nitride and a refractory compound in a conventional manner. While the coefficient of thermal expansion of these composites will vary depending upon the amount and particular refractory material present, a 20 per cent to 40 per cent lower coefficient is exhibited by the composites of the present invention, with the coefficient of such composites not exceeding $9.0 \times 10^{-6}/°C$. to 1,800° C. (parallel to the direction of hot pressing).

The composites of the present invention exhibit increased thermal shock resistance and can be resistance heated from room temperature to 1,500° C. at a rate of 3,000° C./minute without cracking and are capable of withstanding in excess of 150 such heating cycles without damage from thermal shock. On the other hand, composites formed from boron nitride and a refractory material in a conventional manner crack after only about 20 to 30 such cycles when heated in this manner. Because of the increased thermal shock resistance of the composites of the present invention, resistance heated evaporating crucibles produced from such composites are especially suitable for the flash vaporization of aluminum and other metals in the vacuum metallizing of materials in the electronic and decorative coating industries. In addition, while crucibles produced from boron nitride and a refractory compound in a conventional manner are at the upper limit of their thermal stability at about 1,800° C., crucibles prepared from the composites of the present invention can be employed at temperatures in excess of 2,200° C. Because of this increased thermal stability, the crucibles prepared from the composites of the present invention are especially suitable for the vaporization of metals such as copper, silver, gold, chromium, iron, and the like, where high temperatures are required.

EXAMPLE 2

Fifteen evaporator vessels of the type described in U.S. Letters Pat. No. 3,181,968 were machined from a composite prepared by hot pressing a uniform blend containing 50 per cent by weight titanium diboride and 50 per cent by weight of boron nitride at a temperature of 1,800° C. and a pressure of 2,000 psi. The outside dimensions of each evaporator vessel were 5½ inches long by ½ inch wide by ¼ inch thick. The dimensions of the cavity in the vessel were 4 inches long by 1/16 inch deep. The vessels had electrical resistivities at room temperature ranging from 927 to 1,266 $\mu$ ohm cm. and densities ranging from 2.7 grams/cc. to 2.8 grams/cc.

Each vessel was then dried by heating at 200° C., weighed, and leached in boiling methanol until no further weight loss occurred. A period of 43 hours was required to bring the vessel to constant weight. The loss in weight was due to the removal of boron oxide ($B_2O_3$) and averaged 3.5 per cent of the original weight of the vessels.

After leaching, the vessels were dried at 100° C. for 16 hours and then heated to about 1,975° C. under an atmosphere of flowing argon over a period of 6 hours (3 hours to heat from room temperature to 1,500° C., 1 hour to heat from 1,500° to 1,675° C., 2 hours to heat from 1,675° to 1,975° C.) and maintained at this temperature for 3 hours. At the end of this time the vessels were cooled while still in an argon atmosphere. The vessels were then weighed and found to have undergone a further average weight loss of 1.8 per cent (based on the original weight of the vessels). The vessels obtained in this manner had densities ranging from 2.65 grams/cc. to 2.69 grams/cc. and electrical resistivities ranging from 907 to 1,950 $\mu$ ohm cm. The average oxygen content of the vessels so treated was determined to be 0.29 per cent by weight, from which a boron oxide ($B_2O_3$) content of 0.42 per cent was calculated.

EXAMPLE 3

Four evaporator vessels 5 inches long by ½ inch wide by ¼ inch thick having electrical resistivities ranging from 837 to 1,121 $\mu$ ohm cm. at room temperature were prepared in the same manner and from the same composition employed in Example 2 and subjected to a cyclic thermal shock test by resistance heating the vessels connected in parallel in a cylindrically shaped vacuum metallizing chamber under a pressure of 0.3 micron of mercury to 1,500° C. in one-half minute, maintaining the temperature at 1,500° C. for one and one-half minutes, and then cooling to below red heat over a period of one and one-half minutes. The power usage during the one and one-half minute hold period was $10 \pm 0.3$ KVA. The vessels each withstood 150 cycles with no sign of cracking. When like hot pressed vessels which were not treated with methanol and sintered at 2,000° C. were tested in a similar manner all failed after only 20 cycles.

The same four evaporator vessels were then each employed in 50 flash aluminum vaporizations. One gram of aluminum was evaporated from each vessel per flash by resistance heating the vessels connected in parallel in the chamber described above to 1,500° C. in one-half minute at a pressure of 0.3 micron of mercury, maintaining the temperature of 1,500° C. for one-half minute, and then cooling to below red heat over a period of one minute. The total power requirements to flash the aluminum from the vessels at the flash temperature ranged from 5.1 to 6.3 KVA. After 50 tests, the vessels showed no signs of cracking or failure. On the other hand, hot pressed vessels which have not been treated with methanol and sintered at 2,000° C. fail by cracking after only 4 to 5 cycles.

EXAMPLE 4

An evaporator vessel 5 inches long by ¾ inch wide by ½ inch thick (cavity dimensions 3 inches long by ⅛ inch deep) was prepared in the same manner and from the same composition employed in Example 2 and employed in the continuous vaporization of high purity copper. The vessel was placed in a cylindrically shaped vacuum metallizing chamber and resistance heated under a pressure of 0.3 micron of mercury to 1,600° C. in two minutes. A roll of 0.064 inch diameter 99 per cent plus purity copper was then fed to the vessel cavity at a rate of 5 grams per minute. The rate of feed was maintained during the entire run during which approximately 4.7 pounds of copper were evaporated. The temperature required during this run to maintain copper vaporization was as high as 1,900° C. The vessel operated for 421 minutes without failure.

When a like hot pressed vessel which had not been treated with methanol and sintered at 2,000° C. was employed, the vessel cracked after the introduction of copper to the vessel cavity before it reached the temperature required for vaporization of copper (approximately 1,700°–1,800° C.)

EXAMPLE 5

Twenty evaporator vessels of the type described in U.S. Letters Pat. No. 3,181,968 were machined from a composite prepared by hot pressing a uniform blend containing 70 per cent by weight titanium diboride and 30 per cent by weight of boron nitride at a temperature of 1,800° C. and a pressure of 2,000 psi. The outside dimensions of each evaporator vessel were 5 inches long by ¾ inch wide by ½ inch thick. The dimensions of the cavity in the vessel were 3 inches long by ⅛ inch deep. The vessels had electrical resistivities at room temperature ranging from 40 to 60 $\mu$ ohm cm. and densities ranging from 3.24 grams/cc. to 3.37 grams/cc.

Each vessel was then dried by heating at 200° C., weighed, and leached in boiling methanol until no further weight loss occurred. A period of 12 hours was required to bring the vessel to constant weight. The loss in weight was due to the removal of boron oxide ($B_2O_3$) and averaged 2.5 per cent of the original weight of the vessels.

After leaching, the vessels were dried at 100° C. for 16 hours and then heated to about 1,975° C. under an atmosphere of flowing argon over a period of 6 hours (3 hours to heat from room temperature to 1,500° C., 1 hour to heat from 1,500° to 1,675° C., 2 hours to heat from 1,675° C. to 1,975° C.) and maintained at this temperature for 3 hours. At the end of this time the vessels were cooled while still in an argon atmosphere. The vessels were then weighed and found to have undergone a further average weight loss of 2.1 per cent (based on the original weight of the vessels). The vessels obtained in this manner had densities ranging from 3.03 grams/cc. to 3.09 grams/cc. and electrical resistivities ranging from 51 to 58 μ ohm cm. The average oxygen content of the vessels so treated was determined to be 0.24 per cent by weight, from which a boron oxide ($B_2O_3$) content of 0.34 per cent was calculated.

One of the vessels so produced was then employed in the continuous vaporization of high purity copper in the manner described in Example 4. The vessel operated for 87 minutes without failure. When a like hot pressed vessel which had not been treated with methanol and sintered at 2,000° C. was employed, the vessel cracked after the introduction of copper to the vessel cavity before it reached the temperature required for vaporization of copper (approximately 1,700°–1,800° C.).

When a similar vessel was prepared in the same manner from the same composition was subjected to the same cyclic thermal shock test as described in Example 3, the vessel withstood 150 cycles with no sign of cracking. When a like hot pressed vessel which had not been treated with methanol and sintered at 2,000° C. was tested in the same manner, it failed after only 30 cycles.

What is claimed is:

1. An electrically conductive composite article consisting essentially of from about 50 per cent by weight to about 70 per cent by weight of an electrically conductive refractory boride compound and from about 30 per cent by weight to about 50 per cent by weight of boron nitride, said composite article having an oxygen content of less than 0.5 per cent by weight, a coefficient of thermal expansion parallel to the direction of hot pressing of below $9.0 \times 10^{-6}/°$ C. to 1,800° C., an uninterrupted increase in flexural strength with increasing temperatures up to about 1,500° C., a moisture pickup of less than 1 per cent after exposure to 100 per cent relative humidity for 100 hours at room temperature, an irreversible thermal expansion of less than 0.3 per cent when heated to 1,800° C. and subsequently cooled to room temperature, a thermal stability in excess of 2,200° C., and the capacity of being heated in excess of 150 cycles from room temperature to 1,500° C. at a rate of 3,000° C./minute without damage from thermal shock.

2. An electrically conductive composite article as in claim 1 wherein the electrically conductive refractory boride compound is titanium diboride.

3. An electrically conductive composite article as in claim 1 in the shape of an evaporating crucible.

4. An electrically conductive composite article as in claim 2 in the shape of an evaporating crucible.

5. A process for producing electrically conductive composite articles having an oxygen content of less than 0.5 per cent by weight which comprises treating a hot pressed blend of from about 50 per cent by weight to about 70 per cent by weight of an electrically conductive refractory boride compound and from about 30 per cent by weight to about 50 per cent by weight of boron nitride with a solvent capable of removing boron oxide therefrom until said hot pressed blend undergoes no further weight loss, drying the hot pressed blend by heating, and sintering the dried treated blend in an inert atmosphere at a temperature of from 1,600° to 2,100° C. in the absence of pressure.

6. A process as in claim 5 wherein the electrically conductive refractory boride compound is titanium diboride.

7. A process as in claim 6 wherein the solvent is selected from the group consisting of water and alcohols.

8. A process as in claim 6 wherein the solvent is methanol.

9. A process as in claim 5 wherein the sintering temperature is from 1,800° to 2,100° C.

10. A process of claim 9 wherein the electrically conductive refractory boride compound is titanium diboride.

11. A process as in claim 10 wherein the solvent is selected from the group consisting of water and alcohols.

12. A process as in claim 10 wherein the solvent is methanol.

* * * * *

UNITED STATES PATENT OFFICE
CERTIFICATE OF CORRECTION

Patent No. 3,673,118  Issue Date June 27, 1972

Inventor(s) Victor Mandorf, Jr. and Lionel Clayton Montgomery

It is certified that error appears in the above-identified patent and that said Letters Patent are hereby corrected as shown below:

Front page, after "Continuation-in-part of Ser. No. 822,214, May 6, 1969" delete ", abandoned"
Column 1, lines 6-7, delete "now abandoned".

Signed and sealed this 23rd day of January 1973.

(SEAL)
Attest:

EDWARD M. FLETCHER, JR.
Attesting Officer

ROBERT GOTTSCHALK
Commissioner of Patents